Figure 1:
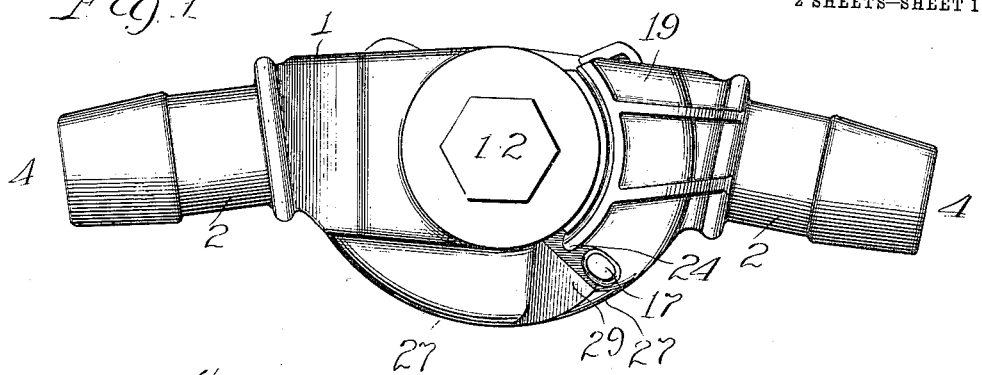
Figure 2:
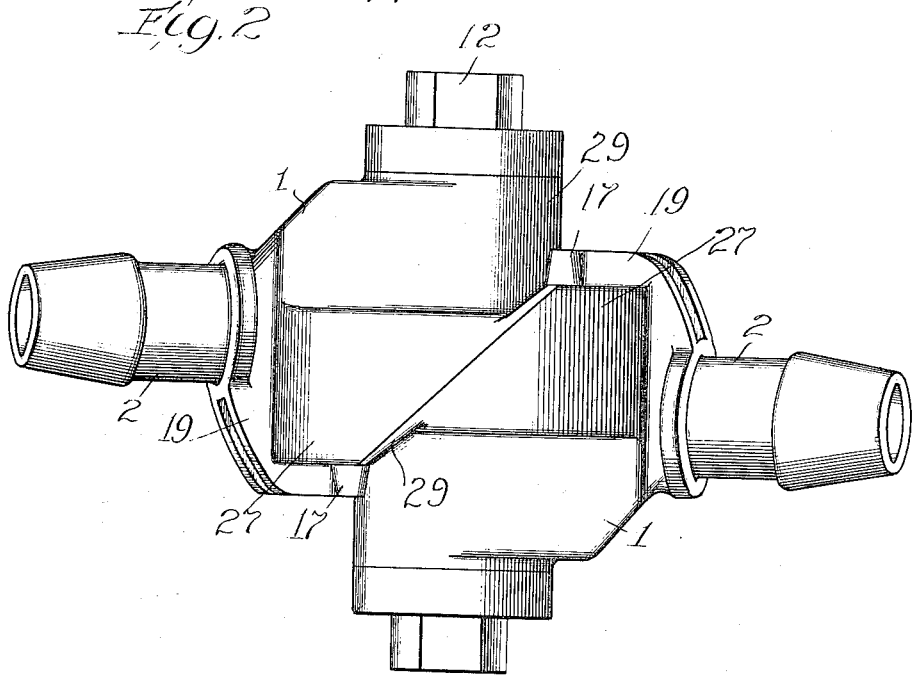
Figure 5:
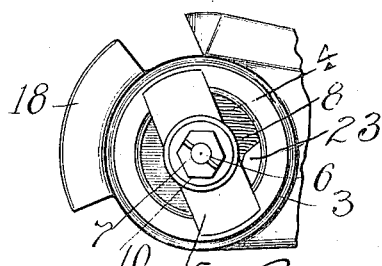

O. P. WILHELM.
AIR BRAKE COUPLING.
APPLICATION FILED OCT. 24, 1910.

1,041,391.

Patented Oct. 15, 1912.
2 SHEETS—SHEET 1.

Witnesses:
H. R. L. White
R. A. White

Inventor
Oliver P. Wilhelm
By Rudolph Wm. Foe Atty.

O. P. WILHELM.
AIR BRAKE COUPLING.
APPLICATION FILED OCT. 24, 1910.
1,041,391.
Patented Oct. 15, 1912.
2 SHEETS—SHEET 2.
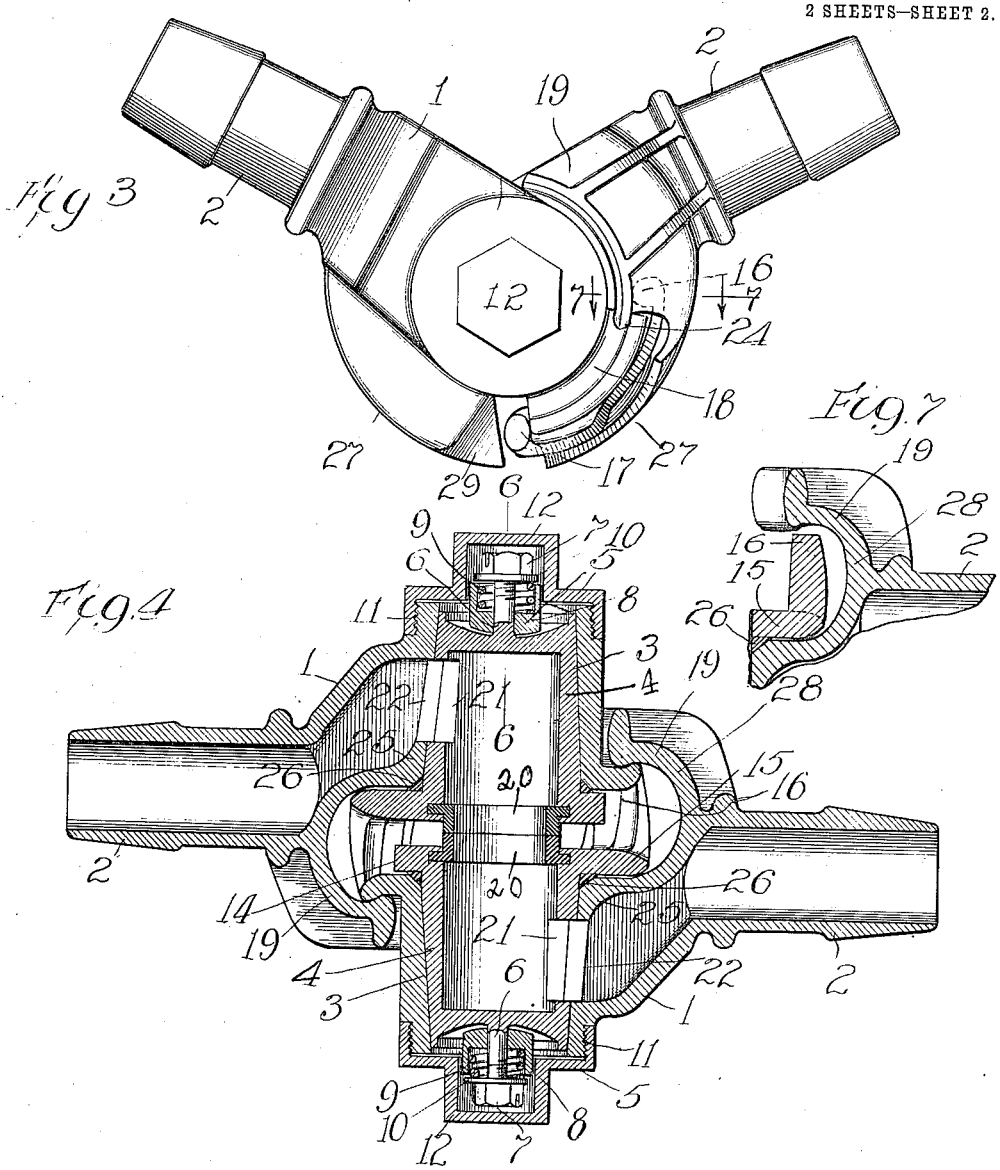
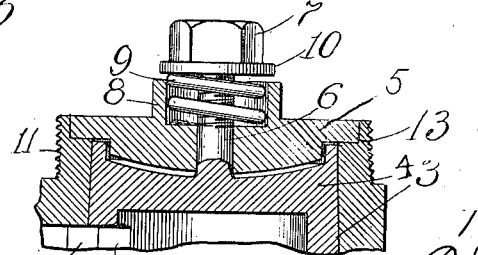

UNITED STATES PATENT OFFICE.

OLIVER P. WILHELM, OF MICHIGAN CITY, INDIANA, ASSIGNOR TO HIMSELF, LANE WILHELM, AND SANTFORD WILHELM, OF MICHIGAN CITY, INDIANA.

AIR-BRAKE COUPLING.

1,041,391. Specification of Letters Patent. Patented Oct. 15, 1912.

Application filed October 24, 1910. Serial No. 588,677.

*To all whom it may concern:*

Be it known that I, OLIVER P. WILHELM, a citizen of the United States, residing at Michigan City, in the county of Laporte and State of Indiana, have invented certain new and useful Improvements in Air-Brake Couplings; and I do hereby declare the following to be a full, clear, and exact description of the invention, such as will enable others skilled in the art to which it appertains to make and use the same.

This invention relates to improvements in hose couplers particularly adapted for use in connection with air brakes, the object being to provide a hose coupling which is safe, durable and efficient, and consists in the features of construction and the combinations of parts hereinafter fully described and claimed.

The present invention relates more particularly to certain new and useful improvements in the details of construction of the hose coupling shown and described in my application for Letters Patent Serial No. 516,489 filed September 7, 1909.

One of the particular objects of my present invention is to provide means whereby when the two members of the coupler are moved relatively into coupled position the valve or valves contained therein will be opened even though certain parts of the coupler shall have suffered injury.

A further particular object of the present invention is to provide means whereby in the event of the breaking of the spring or springs maintaining the valves on their seats the said valve or valves cannot leave their seats to an extent sufficient to cause leakage of such an extent as to interfere with the running of the train.

Another object of the invention is to provide means for preventing the valve from being so tightly seated as to interfere with its operation.

Other objects of the invention will be ascertained from the following description.

In the accompanying drawings illustrating the invention: Figure —1— is a side elevation showing two coupler heads constructed in accordance with my invention disposed in coupled relation. Fig. —2— is a plan view showing two coupling members coupled in the position in which the respective valves thereof are open. Fig. —3— is a view similar to Fig. —1— showing the respective coupler heads moved to the other limits of their relative movement preparatory to uncoupling the same. Fig. —4— is a central sectional view on the line 4—4 of Fig. —1— showing the coupler heads in coupled position. Fig. —5— is a fragmentary plan view of the outer end of one of the coupler heads, the cap covering said end being removed. Fig. —6— is a fragmentary detail section on an enlarged scale on the line 6—6 of Fig. —4—. Fig. —7— is a fragmentary detail section on the line 7—7 of Fig. —3—.

The said coupler head herein illustrated and described is capable of being used in connection with the air brake hose couplers at present employed on practically all railroad cars in North America, as shown in detail in my aforesaid previous application of September 7, 1909; it being deemed superfluous to repeat said illustration herein. The coupler head forming subject of this application is identical in practically all respects with that illustrated and described in my previous application; the particular changes and improvements constituting the present invention relating to certain details of construction which will be hereinafter particularly pointed out.

As the two coupler heads shown are identical in construction the description of one thereof will suffice.

The coupler head consists of a valve casing 1 equipped with a hollow stem 2 and provided with a tapered opening 3 in which the valve 4 seats. The latter is slightly conical or like a truncated cone, its circumferential wall being tapered to fit said opening 3. Spanning said opening 3 at its smaller end is a removable bar 5 provided with a central opening through which the stem 6 of the valve 4 projects; the latter being threaded and adapted to receive the nut 7 on its free end. The said bar 5 is provided with an annular flange 8 concentric with the opening therein and forming a cylindrical pocket in which the spring 9 is received. The latter bears at one end upon the bottom wall of said pocket and at its other end upon the washer 10 disposed on the valve stem 6; the said washer being of greater diameter than the recess of said pocket and adapted to coact with the flange 8 to limit the movement of said valve in one direction.

The valve casing is externally threaded at its outer end, as at 11, to receive the cap 12 which covers said end of said valve casing and the cross-bar, valve stem etc., heretofore described. The said cross-bar 5 is mounted at its ends in recesses 13 in said end of said valve casing as shown in detail in Fig. —6—. Said valve 4 is provided at its other end with an annular flange 14, the latter being extended at one point to form a segmental lip 15 which is equipped at its ends with projections 16 and 17; said projection 16 being shown in dotted lines in Fig. —3—. The said flange 14 and its lip 15 are disposed externally of the valve casing and project beyond the face of the latter adapted to oppose the same face of the companion coupler head. The valve casing is provided at one point with a segmental lip 18 and at a diametrically opposite point with an overhanging wing 19 in the usual well-known manner and of the ordinary construction, the lips and wings of companion coupler heads engaging each other to maintain said heads in coupled relation and serving when engaged to compress the washers 20 at the mouths of the valves 4 against each other to form a fluid tight joint between the same.

The lip of one coupling member is adapted to be received between the projections 16 and 17 of the valve of the other coupler head so that relative rotary movement of two engaged heads is imparted to said valves to open and close the same. Said valve 4 is provided at one point with a port 21 adapted to register with a port 22 establishing communication between the opening 3 of the valve casing and the stem 2 thereof. Said projections 16 and 17 of the valve are so located relatively to said port 21 and the valve so disposed relatively to the port 22 that when the companion coupler heads are moved into relative coupled positions the said ports 21 and 22 will register with each other and that when said coupler heads are relatively rotated to uncouple the same the port 21 will move entirely out of communicating relation to the port 22.

As shown in Fig. —3— in which the companion coupler heads are represented as being disposed in relative position to disengage the lips and wings thereof the said projection 16 is disposed underneath the wing of the member carrying the valve, said projection 16 remaining always underneath the said wing. The movement of the valve in either direction is determined by a projection 23 on the lower end thereof which engages the said bar 5; the limits of movement of said valve being coincident with the arc of movement necessary to effect either coupling or uncoupling of the coupler heads.

It is sometimes possible to so engage two coupler members with each other as to prevent them from falling apart but so that very little separating force would disengage them from each other, the opposed openings in the heads for the passage of air being out of register. This is caused by failure to push the lips sufficiently far under the wings of opposed members to throw the ribs of the former back of the ribs of the latter. It is essential to the proper operation of my coupler that incomplete coupling be prevented as the latter might otherwise be effected without operating the valves or while one of the same is partially open. To this end, as shown in Fig. —7—, the projection 16 extends at its innermost edge (radially) underneath the ridge or rib of the wing 19 so that all attempts to insert the lip of the other member sufficiently far underneath the said wing to effect engagement while the valve is not entirely closed will be prevented.

It is desirable in effecting coupling or uncoupling of the coupler heads that the same be moved into the requisite opposing relation in a direction transverse to the axis of relative rotation thereof instead of being brought together by movement in a direction longitudinally or substantially longitudinally of their axis of relative rotation and furthermore that in uncoupling the same after relative rotation to the proper limit of their relative movement that they should be capable of separation by further relative movement in one direction only so as to guard against their being readily uncoupled by accident. To effect this I provide a projection 24 on the wing 19 of each coupler head which serves to decrease the width of the space between said wing and the projection 17 of the valve when the latter is closed so that the lip 18 of the other member cannot pass outwardly through said space but must be withdrawn laterally from engagement with said projections 16 and 17.

Owing to the taper of the opening 3 and the circumferential wall of the valve 4 the latter might be drawn so firmly inwardly as to cause the same to bind to an extent sufficient to prevent the same from being turned by hand. To overcome this difficulty I provide at the mouth of the opening 3 a beveled seat 25 for a washer 26 mounted upon the valve 4 and bearing at one end upon the inner face of the flange 14 thereof; said seat 25 and said beveled face of said washer 26 being ground to form a fluid tight joint between the same, said washer being also ground to exactly fit the circumferential wall of the valve 4 adjacent the flange 14. The said washer 26 serves to limit the movement of the valve 4 inwardly of the valve casing so as to insure a fluid tight joint but at the same time maintain said valve relatively easily rotatable in said casing. Said washer serves further to prevent the passage of dust between the opposing walls of the valve and valve casing as will be obvious.

Air brake hose coupler heads are subjected to very rough usage and, therefore, in order to prevent injury to the lip 15 and projections 16 and 17 of the valve and further to prevent accidental operation of said valve by striking any obstruction in travel of the train I provide on each coupler head a segmental flange extending transversely to the axis of the valve 4 and which terminates in a segmental lip 27 concentric with said axis, said flange and lip 27 forming substantially a continuation of the flange 28 of the coupler head which terminates in said wing 19. The other end of said lip 27 is cut off at an angle of about forty-five degrees and the flange carrying said lip terminates in a projection 29 also disposed at said angle and one face of which is flush with the inclined edge of said lip 27. The inclined ends of said lips 27 of companion coupler heads are adapted to meet when said coupler heads have been turned into relative coupled relation and when so disposed said lips 27 inclose and protect the exposed portions of the valves 4 and serve to prevent the admission of dirt as well as to prevent any obstruction on the road bed from coming in contact with any part of the valves and thus separate the latter. Each of said projections 29 is further adapted to engage the projection 17 of the valve of the companion coupler head so that in the event that the lip 18 of the coupler carrying the projection 29 should be partly broken away and thus incapable of insuring full opening of the valve of the companion coupler head the said projection 29 will by engagement with said projection 17 insure said valve being open when the coupler heads have been relatively rotated into coupled relation. The said lip 27 serves to protect the segmental lip 15 and the projection 17 from contact with obstructions on the road bed when the valve 4 is closed and the coupler heads depend as at the rear end of the last car in the train.

It will be noted that the projection 17 is of a height sufficient to engage the wing 19 of its carrying member and that the projection 16 is of a height almost sufficient to contact with the under face of the wing 19. Hence, in the event of any injury to the valve retaining means hereinbefore described the said projection 16 will prevent the valve 4 from rising a distance greater than the space between the free end of said projection 16 and the opposing wall of the wing 19. Owing to the slight taper of the valve and of the opening 3 said valve could not move from its seat a distance sufficient to cause such a degree of leakage as would interfere with the operation of the air brake and the running of the train; this being very important as will be obvious.

I claim as my invention:

1. In a hose coupler head provided with a tapered valve seat open at both ends and of greater diameter at the end adapted to oppose a companion head, the wall of said valve seat annularly beveled at said end, a tapered valve adapted to seat therein, a ring triangular in cross-section seating in the beveled mouth of said valve-seat, an annular flange on said valve bearing on said ring, the latter adapted to limit the movement of said valve toward its seat, a stem on the smaller end of said valve, a cross-bar in said head spanning said valve-seat at its smaller end, a hollow cylindrical projection between the ends of said bar concentric with an opening therein through which the stem of said valve passes, a collar on the latter of greater diameter than the recess in said projection, and a compression spring in said recess bearing on said collar to maintain said valve seated, said collar coacting with said projection to limit the movement of said valve from its seat.

2. In a hose coupler head provided with a tapered valve seat open at both ends and of greater diameter at the end adapted to oppose a companion head, the wall of said valve seat annularly beveled at said end, a tapered valve adapted to seat therein, a ring triangular in cross-section seating in the beveled mouth of said valve-seat, an annular flange on said valve bearing on said ring, the latter adapted to limit the movement of said valve toward its seat, a stem on the smaller end of said valve, a cross-bar in said head spanning said valve-seat at its smaller end, a hollow cylindrical projection between the ends of said bar concentric with an opening therein through which the stem of said valve passes, an adjustable collar on the latter of greater diameter than the recess in said projection, and a compression spring in said recess bearing on said collar to maintain said valve seated, said collar coacting with said projection to limit the movement of said valve from its seat.

3. In a hose coupler head provided with a tapered opening of greater diameter at the end adapted to oppose a companion head, the wall of said opening annularly beveled at said end, a tapered valve adapted to seat in said opening, a stem on the smaller end of said valve, a cross-bar in said head spanning said opening at its smaller end, a hollow cylindrical projection between the ends of said bar concentric with an opening therein through which the stem of said valve passes, a collar on the latter of greater diameter than the recess in said projection, and a compression spring in said recess bearing on said collar to maintain said valve seated, said collar coacting with said projection to limit the movement of said valve from its seat, an annular flange on the larger end of said valve, and a ring having a beveled face adapted to seat on the beveled portion of the wall of the opening in said head interposed between the latter and said annular flange, substantially as and for the purpose specified.

4. A hose coupling comprising two opposed members, a lip and a wing on each thereof, the lip of each adapted to engage the wing of the other to maintain said members in coupled relation, a valve in each of said members controlling communication between the same, a segmental flange on each of said valves terminating at its ends in projections between which the lip of the other member is adapted to be received, whereby relative rotary movement of said members is transmitted to said valves to open and close the same, said segmental flange of each valve adapted to pass underneath the wing of its carrying member when said valve is opened, a segmental lip on each of said members forming a guard for said segmental flange of said valve when the latter is open, the ends of the said segmental lips of companion members meeting when said members are moved into relative coupled positions, and a projection flush with one end of said lip and adapted to engage one of said projections on said segmental flange to turn said valve when the said members are moved into coupled position, substantially as and for the purpose described.

5. A hose coupling comprising two opposed members, a valve in each controlling communication between the same, projections on each of said members engaging similar projections on the other thereof to hold the same in coupled relation, projections on each of said valves adapted to be engaged by one of said projections of the other member to impart movement to said valve to open and close the same as said members are manually coupled and uncoupled respectively, and a projection on each of said members adapted to engage one of the projections of the valve of the other member to close the latter as said members are moved into coupled relation, whereby when the first-named valve-actuating projection of either member should be broken, opening of the valve in coupling said members will be assured.

6. A hose coupling comprising two opposed members, a lip and a wing on each thereof, the lip of each adapted to engage the wing of the other to maintain said members in coupled relation, a valve in each of said members controlling communication between the same, a segmental flange on each of said valves terminating at its ends in projections between which the lip of the other member is adapted to be received, whereby relative rotary movement of said members is transmitted to said valves to open and close the same, said segmental flange of each valve adapted to pass underneath the wing of its carrying member when said valve is opened, one of said projections on said valve adapted to be engaged by the lip of the other member being adapted to pass underneath the wing of its carrying member when said valve is turned in a direction to open the same, said projection so disposed relatively to the ridge of said wing as to prevent its engagement with the lip of the other member when said valve is partially open.

In testimony whereof I have signed my name in presence of two subscribing witnesses.

OLIVER P. WILHELM.

Witnesses:
 RUDOLPH WM. LOTZ,
 LANE WILHELM.